May 27, 1958    S. RATCLIFFE    2,836,721
SERVO SYSTEMS

Filed Sept. 22, 1952    2 Sheets-Sheet 1

INVENTOR:-
Stanley Ratcliffe
By
Cushman, Darby + Cushman
Attorneys of # United States Patent Office 2,836,721
Patented May 27, 1958

2,836,721

SERVO SYSTEMS

Stanley Ratcliffe, Great Malvern, England, assignor to National Research Development Corporation, London, England, a corporation of Great Britain Application September 22, 1952, Serial No. 310,891

Claims priority, application Great Britain September 29, 1951

9 Claims. (Cl. 250—36)

This invention relates to automatic frequency control systems for high frequency electric oscillators, for example, of the klystron type. In this type of source high frequency oscillations are generated by the interaction of an electron beam, passing between appropriate electrodes, and a resonant cavity and in which control of output oscillation frequency can be achieved in two ways; one way utilizing means for adjustment of cavity size or shape, the other utilizing means for adjustment of a voltage on a frequency determining electrode.

In a reflex klystron oscillator it has been proposed to control the oscillator frequency by simultaneous automatic adjustment of the klystron reflector voltage and of the size or shape of the resonant cavity in response to one output of the same discriminator acting as a measuring means. A discriminator is a device which gives a signal characteristic of the degree of mistune of the oscillation, i. e. the sense and size of deviation of the oscillator frequency from a given reference oscillation frequency. Automatic frequency control of this type may be performed whether the reference oscillation is of pulse or continuous form.

In practice, such a system operates to give an oscillator frequency constant relative to the given reference oscillation frequency, but due to the other properties of the klystron oscillator one of the ways of correction always operates to the detriment of the other. For example, the reflector voltage adjustment, being more quickly effective but of smaller frequency range than the cavity adjustment, may operate to the extreme of its effectiveness so that the cavity adjustment is only able to act on the error remaining after the voltage adjustment has finished. Thus, for a great part of the range of control possible, the reflector voltage adjustment is at the extreme of its effectiveness, and the cavity adjustment is hardly effective. This gives several obvious disadvantages, one of the most important of which is that, with the quicker acting adjustment (reflector voltage) fully extended, there is no scope for correction of further quick changes of frequency of the oscillator which therefore have to be coped with by the slower acting cavity adjustment. It would be preferable for example if both correction means could be made effective in such a manner that there is always a margin of adjustment of the reflector voltage available to deal with quick, small changes of oscillator frequency.

In practice the difficulties of this form of control have been avoided in the solution of the problem. For instance, in my British Patent No. 670,238 the cavity adjustment has not been performed in response to the discriminator output but in response to another system parameter altogether, viz. the power output of the oscillator. This is adequate for solving the problem where a symmetrical power output-frequency curve is possible for each reflector voltage but cannot of course be operative where serious asymmetry exists. For oscillators having serious asymmetrical power output-frequency curves, the solution of my British Patent No. 670,238 cannot be used and the problem again has to be faced of using two ways of adjustment of frequency in the servo-loop.

It is accordingly an object of the present invention to provide an improved automatic frequency control system for a klystron oscillator in which the output oscillation frequency is corrected by more than one way of adjustment in response to the same error information.

A further object of the invention is to provide such a system in which the disadvantages described above are reduced to a large extent.

According to the invention there is provided an automatic frequency control system for high frequency oscillators of the klystron type comprising an oscillator having two frequency control means, consisting, in the klystron case, of a cavity adjustment means and a means for the adjustment of a voltage on a frequency determining electrode, a discriminator, a first control path adapted to feed mistune signals from the discriminator to control the output frequency of the oscillator by one of the control means, and a second control path adapted to feed mistune signals from the discriminator via a threshold device to control the output frequency of the oscillator by the other of the two control means, whereby this other control means is not effective for a zone of frequencies around a frequency related to a given reference oscillation frequency.

A threshold device is a circuit which gives an output for the control of the oscillator frequency only when the scalar value of its input from the discriminator exceeds a given value; when its input is below this value its output is negligible.

In order that the invention may be clearly understood two embodiments thereof will now be described.

Reference will be made to the accompanying drawings in which.

Figure 1:
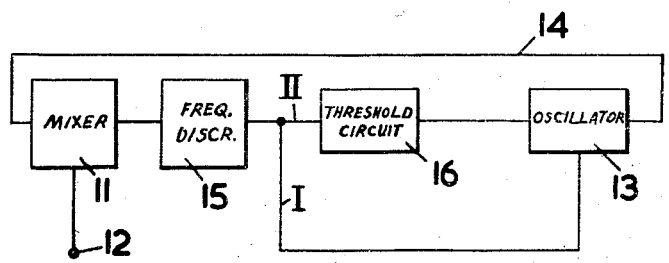
Fig. 1 shows schematically an automatic frequency control arrangement.

Referring now to Fig. 1, a mixer 11 is fed from a terminal 12 by a source of reference frequency oscillations and from a klystron oscillator circuit 13, over lead 14, with the oscillations whose frequency it is desired to maintain constant relative to the frequency of the reference oscillations. The klystron oscillator circuit 13 includes means for cavity adjustment and means for reflector voltage adjustment giving two more or less independent ways or means of adjustment of the frequency of the oscillator 13.

The output of the mixer circuit 11 is fed to a discriminator 15 which gives an output, according to the output of the mixer circuit 11, which indicates the degree of any mistune of the oscillator of circuit 13. The discriminator 15 is of known and conventional design and is of the type used also in my British Patents Nos. 641,-890, 641,900, 641,889 and others.

The output of the discriminator 15 is fed to the oscillator circuit 13 by two paths I and II. Path I connects the discriminator output directly to one of the frequency adjustment means of the oscillator circuit 13, say the cavity adjustment means, and path II connects the discriminator output to the other of the frequency adjustment means of the oscillator circuit 13, in this case the reflector voltage control, via a threshold circuit 16.

The cavity adjustment means may conveniently be of the motor driven type described by Moxon et al. in the Journal of the Institution of Electrical Engineers 1946, vol. 99, Part IIIA, page 1149 et seq. Other suitable motor drives are known and may be used if desired.

Figure 6:
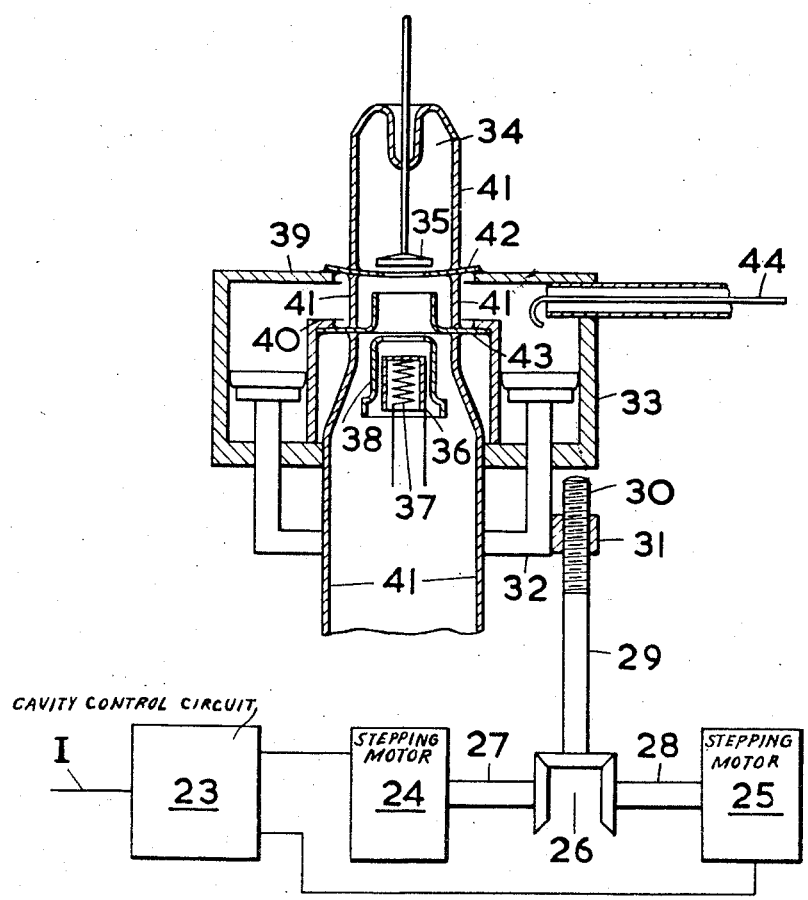
Fig. 6 shows an arrangement for mechanical tuning of a klystron.

The mode of coupling of the motor to the cavity is illustrated in Fig. 6.

A lead 1 corresponding to path I of Fig. 1 feeds the cavity control signal from the discriminator 15 to a cavity control circuit 23 of the type described by Moxon (referred to above). The circuit 23 provides control signals according to the direction of mistune of the klystron oscillator for stepping motors 24 and 25. These motors respectively couple to the differential gear 26 by shafts 27 and 28. The output shaft 29 of the gearing 26 is screwed at its end 30 and runs in a nut 31 fixed to a plunger system 32.

The plunger system 32 forms part of a reflector klystron cavity 33 and serves to change its dimensions and hence the frequency of oscillation. The cavity 33 forms part of and is coupled to a klystron tube 34 the relevant parts only of which are shown in the interests of simplicity. The klystron tube 34 as far as it is shown comprises a reflector 35, a cathode 36 with a heater 37 and a gun 38. The walls 39 and 40 of the external cavity 33 are extended to within the glass envelope 41 of the klystron tube 34 by means of copper discs 42 and 43 sealed in the envelope 41.

The output of the klystron 34 is taken from the cavity 33 by means of the probe 44. A tube of this type is described in the Bell System Technical Journal volume XXVI No. 3, July 1947 as W. E. No. 707–A.

The gearing ratios involved in the drive to the cavity 33 from the stepping motors 24 and 25 depend upon the cavity characteristics and the speed of frequency change required by means of cavity adjustment. Thermal drifts and slow changes of frequency of oscillation at wavelengths of 3 cms. for example usually do not demand greater rates of change than 5 mc./sec./sec., but to obtain a reasonable speed of initial search before the automatic frequency control comes into operation and because it is convenient to make use of the same drive (motor circuits and gearing) to perform this initial search higher rates of change of frequency may be required.

Moreover, to maintain the cavity control path I in this case substantially free of backlash it is necessary to ensure that for one step of a driving motor 24 or 25 the change of frequency will not be more than, say, ¼ the threshold caused by the threshold circuit 16. For a typical figure of ±100 kc./s. the change of frequency per step must not therefore exceed 50 kc./s.

According to the output level of the discriminator 15 a D. C. amplifier may be used to connect the threshold circuit to the reflector electrode. This will, of course, be mainly an economic matter of determining whether a high output discriminator or a low output discriminator followed at a subsequent point by an amplifier is preferable. The ideal requirement is for the mean voltage of the reflector to be of a value to give the desired mean klystron oscillation frequency for a cavity setting corresponding to a power output maximum.

The reflector voltage control may comprise, in the case where the reference oscillation is in pulse form, a condenser connected to the reflector electrode of the klystron to maintain the mean voltage of the reflector corresponding to the klystron mean frequency.

Figure 4:
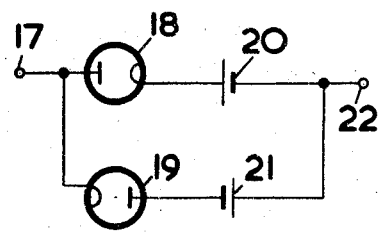
Fig. 4 shows a threshold circuit.

The threshold circuit 16 is shown in more detail in Fig. 4. An input terminal 17 connects to the anode of a diode 18 and the cathode of a second diode 19. The cathode of diode 18 connects via a positive bias battery 20 to an output terminal 22 to which the anode of the diode 19 also connects via a negative bias battery 21.

Figure 2:
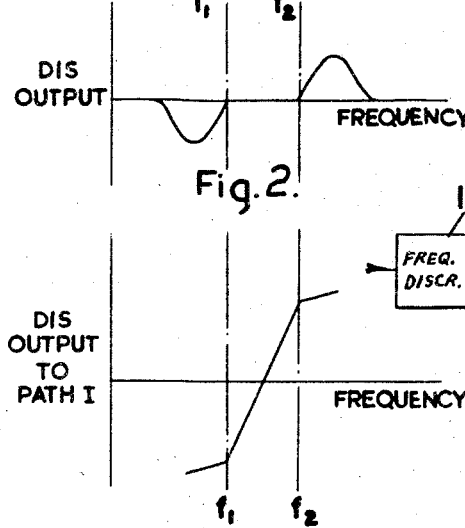
Figs. 2 and 3 show characteristics of control paths used in an arrangement of the invention.

Now, if a conventional discriminator output is applied to the terminal 17 of the threshold circuit of Fig. 4, the diode 18 will only conduct and pass that positive part of the discriminator output above the voltage of the positive bias battery 20 and, similarly, the diode 19 will only conduct and pass that negative part of the discriminator output below the voltage of the negative bias battery 21. The resultant discriminator characteristic will obviously be as shown in Fig. 2 in which the part of the discriminator characteristic between frequencies $f1$ and $f2$ is suppressed.

The result of the introduction of the threshold circuit 16 into the path II will be that the automatic frequency control will be performed by both paths (i. e. by reflector voltage and cavity adjustment) for frequencies outside the limits $f1$ and $f2$ but when the region between frequencies $f1$ and $f2$ is reached one only of the paths I and II will be operative; in the present case path I is the one and frequency control will be by cavity adjustment between the frequencies $f1$ and $f2$.

Figures 3, 5:
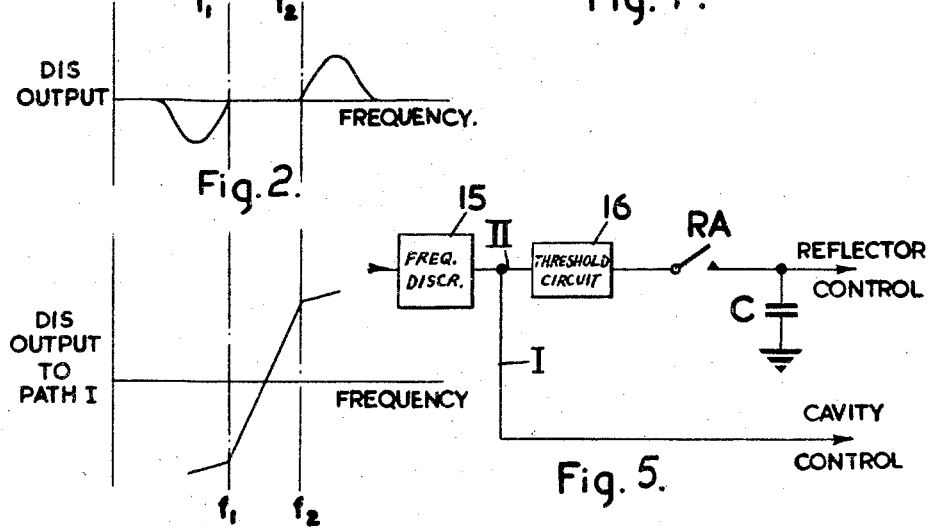
Fig. 5 shows a block schematic circuit of a further automatic frequency control arrangement.

Thus, the input to the path I when path II is connected through the circuit 16 is as shown in Fig. 3. The region $f1$ and $f2$ contains, incidentally, the desired (correct) frequency.

It should be mentioned that, in this automatic frequency control system as in the system of my British Patent No. 670,238, any variation in the reflector voltage-frequency law owing to the simultaneous adjustment of the cavity may be corrected by means of a potentiometer operated by the shaft 29 effecting the cavity adjustment or any other suitable part of the cavity adjustment mechanism. The potentiometer output is then used to modify the reflector voltage in the desired manner as the cavity adjustment takes place.

Although for convenience in the embodiment just described the threshold has been inserted in the path controlling the reflector voltage (there is, here, a certain advantage in that for large degrees of oscillator mistune quicker correction is possible) it will be realised that the threshold may be inserted in the other path controlling the cavity adjustment without detriment to the efficiency of the invention in achieving its objects.

The arrangement according to the invention may also be applied quite simply to the case in which the reference frequency oscillation is only available for short periods separated by relatively long periods. For instance, it may be desired to use a transmitter, transmitting 0.5 μ sec. pulses at a p. r. f. of 50 kc./s. for periods of 40 ms. separated by silent periods of 460 ms., as the source of the reference frequency oscillation.

In such circumstances the system described above with reference to Figs. 1 to 4 although satisfactory for pulse systems will be unable to function correctly except during the very short periods of 40 ms. during which the reference frequency oscillation is available. With certain alterations however it is possible to arrange the circuit to function adequately.

In Fig. 5 the essential parts of the arrangement of Fig. 1 are shown together with the additions required to meet the above circumstances. As previously described, a discriminator 15 feeds via two paths I and II, one without threshold the other with, to the cavity control (not shown) and the reflector control (not shown) respectively. The reflector path II has connected in it a contact RA which is controlled by suitable means to be made only when the reference frequency oscillation is available, in the case instanced above, for the duration of the 40 ms. periods. A condenser C is also connected to the reflector control path; the condenser C is made sufficiently large to maintain the reflector voltage when the reference frequency oscillation is not available, i. e. during the 460 ms. periods, when there is no correcting signal available over the path II. With the condenser C present it should be noted that it will be necessary for sufficient energy to be available over the path II for the charge and discharge of the condenser C so that it is able to follow the voltage corrections.

The action of this arrangement is as follows. During the short periods (40 ms.) the circuit acts under the control of the discriminator 15 output in the normal way, contact RA being closed. During the long periods (460 ms.) the contact RA is broken and so the reflector control voltage is held constant at its last corrected value by the condenser C. The cavity control continues to adjust the cavity in the same sense as that dictated by the last correction signal received from the discriminator.

It will be appreciated that it is necessary to limit the rate of cavity adjustment between periods of availability of the reference frequency oscillation so that the range of effective reflector control is not exceeded before the discriminator 15 control is again available and effective in a succeeding short period.

I claim:

1. An automatic frequency control system for maintaining the frequency of a frequency source constant relative to the frequency of a datum reference source of oscillations, comprising said frequency source adapted to be adjusted in frequency by two separate adjustment means, measuring means comprising a mixer circuit and a frequency discriminator circuit, said mixer circuit being connected to said frequency source and the reference source to mix the frequency thereof, said discriminator being connected to the mixer circuit to derive from the output of the mixer circuit a signal characteristic of the degree of mistune of the frequency source, a first adjustment means associated with said frequency source and connected to the discriminator for adjusting the frequency of the frequency source by one adjustment according to the signal from the discriminator, a threshold means connected to receive the signal from the discriminator and to introduce a positive and negative threshold, and a second adjustment means associated with the frequency source and connected to the threshold means for adjusting the frequency of the frequency source accordingly as part of the signal from the discriminator exceeds a predetermined setting of the threshold means whereby said second adjustment means does not operate in a zone of frequencies around the desired frequency of the frequency source.

2. An automatic frequency control system as claimed in claim 1, wherein said frequency source is a reflex klystron oscillator whose first frequency adjustment means comprises cavity adjustment means and whose second frequency adjustment means comprises reflector voltage control means.

3. An automatic frequency control system as claimed in claim 1, wherein the threshold means comprises a first parallel path and a second parallel path, said parallel paths each comprising a unidirectional conducting element and a source of biasing potential in series, the unidirectional conducting element of the first path conducting in one direction and biased against that direction and the unidirectional conducting element of the second path conducting in the other direction and biased against that other direction.

4. An automatic frequency control system as claimed in claim 3, wherein said frequency source is a reflex klystron oscillator whose first frequency adjustment means comprises cavity adjustment means and whose second frequency adjustment means comprises reflector voltage control means.

5. An automatic frequency control system as claimed in claim 4, for use where the datum reference oscillation is available only at intervals comprising switching means connected in circuit between the threshold means and the second adjustment means and a storage device connected to the second adjustment means, said switching means being adapted to operate to connect the threshold means to the second adjustment means only when the standard oscillation is available and said storage device being adapted to maintain the signal at the second adjustment means at all other times.

6. An automatic frequency control system as claimed in claim 5, wherein the storage device comprises a capacitor.

7. An automatic frequency control system for a reflex klystron having cavity adjustment means and reflector voltage determining means comprising a mixer connected to the klystron, a terminal for connecting to a source of reference oscillations, said terminal being connected to said mixer whereby the mixer can give an output indicative of the frequency relationship between the klystron oscillations and the reference oscillations from the source, a discriminator circuit connected to the mixer output and capable of giving an output voltage characteristic of the degree of mistune of the klystron oscillations, a connexion between the discriminator and the cavity adjustment means whereby the cavity is adjusted according to the said degree of mistune, means for introducing a positive and negative threshold voltage connected to the discriminator circuit and giving an output to the reflector voltage determining means, whereby adjustment of the frequency of the klystron takes place in a zone of frequencies around the desired klystron oscillation frequency only under the control of the cavity resonator adjustment means, said zone being determined in extent by the threshold voltage.

8. An automatic frequency control system for a reflex klystron having cavity adjustment means and reflector voltage determining means comprising a mixer connected to the klystron, a terminal for connecting to a source of reference oscillations, said terminal being connected to said mixer whereby the mixer can give an output indicative of the frequency relationship between the klystron oscillations and the reference oscillations from the source, a discriminator circuit connected to the mixer output and capable of giving an output voltage characteristic of the degree of mistune of the klystron oscillations, a connexion between the discriminator and the cavity adjustment means whereby the cavity is adjusted according to the said degree of mistune, two parallel paths connected between the discriminator circuit and the reflector voltage determining means, one of said paths introducing a positive threshold voltage above which positive going signals from the discriminator must rise before they can be effective to effect a change of frequency of the klystron oscillations, the other of said paths introducing a negative threshold voltage below which negative going signals from the discriminator must fall before they can be effective to effect a change of frequency of the klystron oscillations, whereby adjustment of the frequency of the klystron takes place in a zone of frequencies around the desired klystron oscillation frequency only under the control of the cavity resonator adjustment means, said zone being determined in extent by the threshold voltage.

9. An automatic frequency control system as in claim 1 for use where the datum reference oscillation is available only at intervals, comprising switching means connected in circuit between the backlash means and the second adjustment means and a storage device connected to the second adjustment means, said switching means being adapted to operate to connect the backlash means to the second adjustment means only when the reference oscillation is available and said storage device being adapted to maintain the signal at the second adjustment means at all other times.

References Cited in the file of this patent

UNITED STATES PATENTS

| | | |
|---|---|---|
| 2,410,817 | Ginzton et al. | Nov. 12, 1946 |
| 2,462,857 | Ginzton et al. | Mar. 1, 1949 |
| 2,564,059 | Gensel | Aug. 14, 1951 |
| 2,588,742 | McCallum | Mar. 11, 1952 |
| 2,588,743 | McCallum | Mar. 11, 1952 |
| 2,605,425 | Hugenholtz | July 29, 1952 |
| 2,696,578 | Newell | Dec. 7, 1954 |

UNITED STATES PATENT OFFICE
CERTIFICATE OF CORRECTION

Patent No. 2,836,721

May 27, 1958

Stanley Ratcliffe

It is hereby certified that error appears in the printed specification of the above numbered patent requiring correction and that the said Letters Patent should read as corrected below.

Column 5, line 24, for "frequency" read -- frequencies --; column 6, lines 57 and 60, for "backlash", each occurrence, read -- threshold --.

Signed and sealed this 17th day of November 1959.

(SEAL)
Attest:

KARL H. AXLINE
Attesting Officer

ROBERT C. WATSON
Commissioner of Patents